(12) United States Patent
Zeng et al.

(10) Patent No.: US 10,565,754 B2
(45) Date of Patent: Feb. 18, 2020

(54) METHOD AND DEVICE FOR PLAYING MULTIMEDIA

(71) Applicant: SAMSUNG ELECTRONICS CO., LTD., Suwon-si (KR)

(72) Inventors: Chengbin Zeng, Beijing (CN); Yuxiang Shan, Beijing (CN); Youxin Chen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 14/792,045

(22) Filed: Jul. 6, 2015

(65) Prior Publication Data

US 2016/0005204 A1 Jan. 7, 2016

(30) Foreign Application Priority Data

Jul. 3, 2014 (CN) .......................... 2014 1 0314821
Jun. 15, 2015 (KR) ........................ 10-2015-0084338

(51) Int. Cl.
| | |
|---|---|
| *G06F 17/00* | (2019.01) |
| *G06T 11/60* | (2006.01) |
| *G06F 16/58* | (2019.01) |
| *G11B 27/11* | (2006.01) |

(52) U.S. Cl.
CPC .......... *G06T 11/60* (2013.01); *G06F 16/5866* (2019.01); *G11B 27/11* (2013.01)

(58) Field of Classification Search
CPC .......... G06F 17/30637; G06F 17/2211; G06F 17/30268; G06F 17/30017; G06F 17/30752; G06F 17/28; G06F 17/30056; G06T 11/60; G11B 27/11

USPC .......................................... 715/202; 704/235
See application file for complete search history.

(56) References Cited

U.S. PATENT DOCUMENTS

| | | | | |
|---|---|---|---|---|
| 6,804,295 | B1 * | 10/2004 | Belknap | H04N 21/2368 375/240.01 |
| 8,229,935 | B2 | 7/2012 | Lee et al. | |
| 8,433,575 | B2 | 4/2013 | Eves et al. | |
| 8,676,869 | B2 | 3/2014 | Haartsen et al. | |
| 8,996,538 | B1 * | 3/2015 | Cremer | G06F 17/30864 707/749 |
| 9,213,705 | B1 * | 12/2015 | Story, Jr. | G06F 17/30056 |

(Continued)

FOREIGN PATENT DOCUMENTS

| | | |
|---|---|---|
| CN | 1732692 A | 2/2006 |
| CN | 102099804 A | 6/2011 |

(Continued)

OTHER PUBLICATIONS

Cai, et al., "Automated Music Video Generation using Web Image Resource", IEEE International Conference on Acoustics, Speech and Signal Processing, Apr. 15, 2007-Apr. 20, 2007, vol. 2, pp. 737-740, Honolulu Hawaii , XP 007908440.

(Continued)

*Primary Examiner* — Jason T Edwards
(74) *Attorney, Agent, or Firm* — Sughrue Mion, PLLC

(57) ABSTRACT

Provided are a device and a method for acquiring music information about music played in an electronic device, acquiring a storyline of the music based on the music information, and acquiring and displaying one or more images based on the storyline.

19 Claims, 9 Drawing Sheets

(56) References Cited

U.S. PATENT DOCUMENTS

| | | | |
|---|---|---|---|
| 2006/0085182 A1* | 4/2006 | Eves | G10L 25/48 704/223 |
| 2008/0056574 A1* | 3/2008 | Heck | G06F 17/2765 382/177 |
| 2008/0110322 A1 | 5/2008 | Lee et al. | |
| 2009/0307207 A1* | 12/2009 | Murray | G06F 17/30026 |
| 2010/0017438 A1* | 1/2010 | Haartsen | G06F 17/30265 707/E17.009 |
| 2010/0325581 A1* | 12/2010 | Finkelstein | G06F 17/30 715/810 |
| 2011/0043652 A1* | 2/2011 | King | G06F 17/2211 348/222.1 |
| 2011/0055213 A1* | 3/2011 | Ishizaki | G06F 16/58 707/737 |
| 2012/0259634 A1 | 10/2012 | Tsunokawa | |
| 2012/0275714 A1 | 11/2012 | Gao | |
| 2013/0074133 A1* | 3/2013 | Hwang | G06F 17/30038 725/93 |
| 2015/0142434 A1* | 5/2015 | Wittich | G10L 21/10 704/235 |
| 2015/0169747 A1* | 6/2015 | Hume | G06F 17/30752 704/8 |

FOREIGN PATENT DOCUMENTS

| | | | | |
|---|---|---|---|---|
| WO | 2012/177229 A1 | 12/2012 | | |
| WO | WO 2012177229 A1 * | 12/2012 | ......... | H04N 21/4394 |

OTHER PUBLICATIONS

Shamma, et al., "MusicStory: a Personalized Music Video Creator", ACM International Conference on Multimedia, Jan. 1, 2005, 4 pages total, New York, New York, XP 007908441.

Geleijnse, et al., "Enriching Music with Synchronized Lyrics, Images and Colored Lights", Ambi-Sys, Jan. 1, 2008, Quebec, Canada, 8 pages total, XP 007909556.

Communication dated Dec. 3, 2015, issued by the European Patent Office in counterpart European Patent Application No. 15175311.8.

Communication dated Sep. 7, 2018 issued by the State Intellectual Property Office of P.R. China in Counterpart Chinese Application No. 201410314821.2.

Communication dated Jan. 26, 2018, issued by the State Intellectual Property Office of China in counterpart Chinese Application No. 201410314821.2.

* cited by examiner

METHOD AND DEVICE FOR PLAYING MULTIMEDIA

CROSS-REFERENCE TO RELATED APPLICATIONS

This application claims the benefit of State Intellectual Property Office (SIPO) of the People's Republic of China No. 201410314821.2, filed on Jul. 3, 2014, in State Intellectual Property Office (SIPO) of the People's Republic of China and Korean Patent Application No. 10-2015-0084338, filed on Jun. 15, 2015, in the Korean Intellectual Property Office, the disclosures of which are incorporated herein in their entirety by reference

BACKGROUND

1. Field

The present disclosure relates to a method and a device for playing a multimedia, and more particularly, to a method and a device for displaying an image associated with music when the music is played in an electronic device.

2. Description of the Related Art

Electronic devices, such as a digital audio player, a smartphone, a tablet PC, a smart TV, etc., have been widely used as devices for playing multimedia. These electronic devices may play various types of multimedia files such as music, an image, a video, etc.

Also, although multimedia files are not stored in an electronic device, streaming media may be played in the electronic device through the Internet or the like. As network technologies are developed, types and amounts of digital media that a person may access through electronic devices, have been huge.

When music is played in an electronic device, the electronic device may be embodied to display an image or text associated with the music such as an album cover, lyrics, tag information, etc. of the music so as to enable a user to experience more visual and auditory senses and better understand the music.

However, the album cover of the music is not sufficient to promote the user's understanding of the music.

Also, since the lyrics or the tag information of the music are displayed as text to the user, the user has trouble with recognizing and understanding of the text and consumes much time.

The user may enjoy a video such as a music video of the music through the electronic device to acquire abundant visual and auditory experiences and a deep understanding of the music. However, when a video file, such as the music video of the music is played in the electronic device, a disc capacity of the electronic device may be wasted due to large file size of video files.

When the video files are played in the electronic device through streaming from the Internet or the like, waste of the disc capacity may be less wasted. However, when the electronic device is connected to the Internet through a mobile communication network, the user may be burdened by huge data usage. Although the burden of data usage is slight to the user, the video file may not be smoothly played according to a speed or a state of a connection to the Internet. When the video file is not smoothly played, music that the user wants to enjoy may not also be smoothly played, which may cause an inconvenience of the user.

Therefore, there is a need for a technology that may provide abundant visual and auditory experiences to a user and promote the user's understanding of music when the music is played in an electronic device.

SUMMARY

Provided are a method and a device for displaying an image associated with music when the music is played in an electronic device.

Additional aspects will be set forth in part in the description which follows and, in part, will be apparent from the description, or may be learned by practice of the presented exemplary embodiments.

According to an aspect of an exemplary embodiment, a method of playing a multimedia, includes: acquiring music information about music played in an electronic device; acquiring a storyline of the music based on the music information; acquiring one or more images based on the storyline; and displaying the one or more images.

The music information may include meta-information of the music. The storyline may be acquired based on the meta-information.

The music information may include audio fingerprint information of the music. The storyline may be acquired based on the audio fingerprint information.

The acquiring of the one or more images based on the storyline may include: selecting one or more keywords based on the storyline. The one or more images may be acquired based on the selected one or more keywords.

The acquiring of the one or more images based on the storyline may include: acquiring a plurality of candidate images based on the selected one or more keywords; and determining priorities between the plurality of candidate images based on a preset criterion. The one or more images may be acquired from the plurality of candidate images based on the priorities.

The determining of the priorities between the plurality of candidate images based on the preset criterion may include: acquiring semantic information of the plurality of candidate images. The priorities may be determined by a similarity between the semantic information of the plurality of candidate images and keywords selected based on the storyline.

The storyline may include one or more sentences. The one or more images may be acquired based on the one or more sentences.

The one or more sentences may form one or more paragraphs based on a similarity. The music may be divided into one or more music segments corresponding to the one or more sentences, and the one or more images may be displayed based on the one or more music segments.

The storyline may be lyrics of the music. The music information may include lyric information about the lyrics, and the one or more images are displayed based on the lyric information.

The method may further include: acquiring emotion information based on the storyline. The one or more images may be acquired based on the emotion information.

The one or more images may be rendered based on the emotion information.

The storyline may be divided into one or more paragraphs based on at least one selected from among time information, space information, and character information. The music may be divided into one or more music segments corresponding to the one or more paragraphs, and the one or more images are displayed based on the one or more music segments.

According to an aspect of another exemplary embodiment, a multimedia play device includes: a controller which acquires music information about music played in an electronic device, acquires a storyline of the music based on the music information, and acquires one or more images based on the storyline; and a display unit which displays the one or more images.

The music information may include meta-information of the music. The storyline may be acquired based on the meta-information.

The music information may include audio fingerprint information of the music. The storyline may be acquired based on the audio fingerprint information.

The controller may select one or more keywords based on the storyline. The one or more images may be acquired based on the selected one or more keywords.

The storyline may include one or more sentences. The one or more images may be acquired based on the one or more sentences.

The controller may further acquire emotion information associated with the music based on the storyline. The one or more images may be acquired based on the emotion information.

The storyline may be divided into one or more paragraphs based on at least one selected from among time information, space information, and character information. The music may be divided into one or more music segments corresponding to the one or more paragraphs, and the one or more images are displayed based on the one or more music segments.

According to an aspect of another exemplary embodiment, a non-transitory computer-readable recording medium has recorded thereon a program for realizing the method of.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
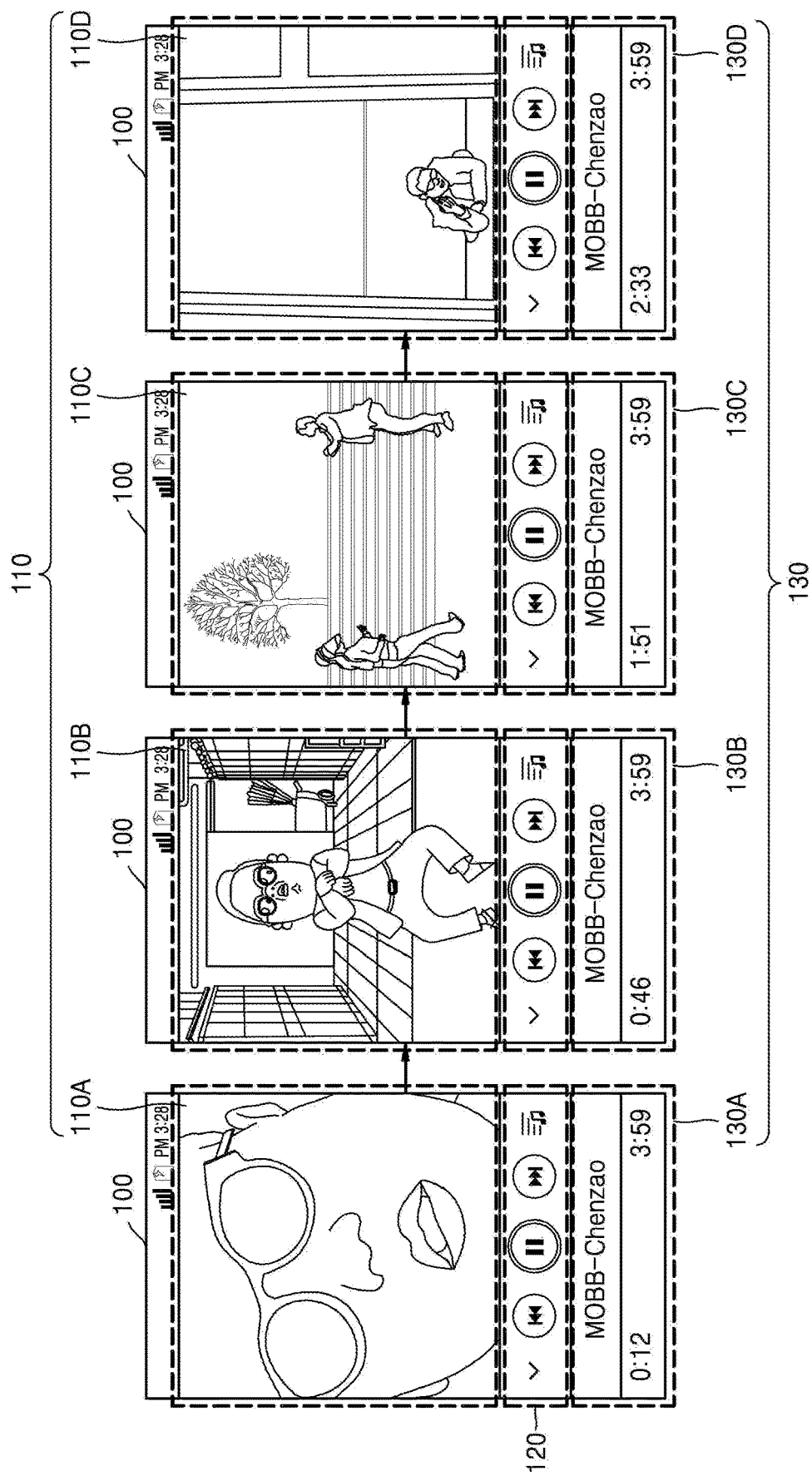
FIG. 1 is a diagram illustrating an example of a displayed image associated with music when the music is played in an electronic device, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In the following description, well-known functions or constructions are not described in detail if it is determined that they would obscure the inventive concept due to unnecessary detail. As used herein, the term "and/or" includes any and all combinations of one or more of the associated listed items. Expressions such as "at least one of," when preceding a list of elements, modify the entire list of elements and do not modify the individual elements of the list.

The terms used herein are general terms that are currently widely used in consideration of functions in the exemplary embodiments but may vary according to intentions of those of ordinary skill in the art, precedents, appearances of new technologies, or the like. Also, the applicant may arbitrarily select terms in a particular case, and meanings of the terms corresponding to this case will be described in detail in the description of the present invention. Therefore, the terms used herein may be defined based on meanings thereof and the overall contents of the exemplary embodiments not based on names of simple terms.

As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. In particular, the numbers mentioned in the present disclosure are merely examples provided to help understanding of the exemplary embodiments set forth herein and thus the exemplary embodiments are not limited thereto.

The term "unit", "module", or the like used herein refers to a unit that processes at least one function or operation. This may be embodied as hardware, software, or a combination of the hardware and the software.

It will be understood that, although the terms first, second, third, etc. may be used herein to describe various elements, these elements should not be limited by these terms. These terms are only used to distinguish one element from another element. Thus, a first element, component, region, layer or section discussed below could be termed a second element, component, region, layer or section without departing from the teachings of the inventive concept.

The terms used herein will be described in brief, and the exemplary embodiments will be described in detail.

Throughout the specification, an electronic device may be a device playable music, i.e., may be a smartphone, a tablet personal computer (PC), a portable phone, a personal digital assistant (PDA), a media player, an audio player, a digital audio player, a portable multimedia player (PMP), an e-book terminal, a digital broadcasting terminal, a PC, a notebook laptop, a micro server, a global positioning system (GPS), a navigation system, a kiosk PC, an MP3 player, a smart TV, a digital camera, other mobile or non-mobile computing devices but is not limited thereto.

Music used herein may refer to an audio file where the music is recorded. A multimedia play application may be driven to play the audio file in the electronic device, and the audio file may be played to play music recorded in the audio file. The multimedia play application is basically installed in an electronic device but may be additionally installed in the electronic device by a user.

A format of the audio file includes all of formats that may be played through the electronic device. The format of the audio file may include an uncompressed audio format, a lossy compressed audio format, a lossless compressed audio format, etc.

For example, the uncompressed audio format may be stored as an extension such as Audio Interchange File Format (AIFF), Waveform Audio file format (WAV), or the like. Also, the lossy compressed audio format may be stored as an extension such as MP3 or Advanced Audio Codec (ACC), and the lossless compressed audio format may be stored as an extension such as Free Lossless Audio Codec (FLAC), APE of Monkey's audio, or the like. However, the format of the audio file is not limited thereto and thus may have various types of extensions.

A multimedia play device used herein may be an electronic device that is able to play music and/or to display an image. Among electronic devices as described above, ones that is able to play music and/or to display images may be all referred to as multimedia play devices.

A storyline of music used herein may refer to a narrative description of the music and may include one or more images, one or more videos, and/or texts for the narrative description.

FIG. 1 is a diagram illustrating an example of a displayed image associated with music when the music is played in an electronic device, according to an exemplary embodiment;

FIG. 1 is illustrating that music is played in one electronic device, and an image associated with the music is displayed. However, music may be played in one electronic device, and an image associated with the music may be displayed in another electronic device.

A multimedia play application 100 may be driven in an electronic device to play music. Here, the play of the music refers to a play of an audio file of the music.

Referring to FIG. 1, the multimedia play application 100 may include an image window 110 that represents an image associated with played music, a controller 120 for controlling the multimedia play application 100, and an information window 130 that represents music information about the played music.

As shown in FIG. 1, when music is played in an electronic device, images 110A, 110B, 110C, and 110D associated with the music may be displayed through the image window 110. The images 110A, 110B, 110C, and 110D associated with the music may be acquired based on a storyline of the music.

The electronic device may acquire the storyline of the music from an external server positioned outside the electronic device.

An image acquired based on the storyline of the music is displayed so as to enable a user enjoying the music to further easily understand the music. Also, abundant visual and auditory experiences may be given to the user.

The electronic device plays the music and displays an image associated with the music. Therefore, resources of the electronic device may be less consumed than playing a video associated with the music. Also, when the electronic device is connected to the Internet through a mobile communication network to play music or to display an image through streaming, a burden of data usage on a user may be lightened than to play a video.

Figure 2:
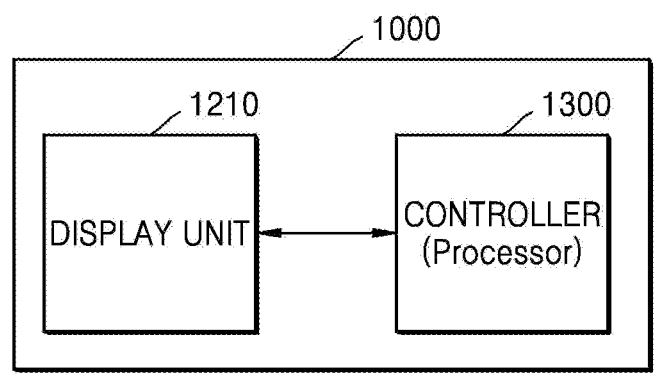
FIGS. 2 and 3 are block diagrams of an electronic device according to an exemplary embodiment.
Figure 3:
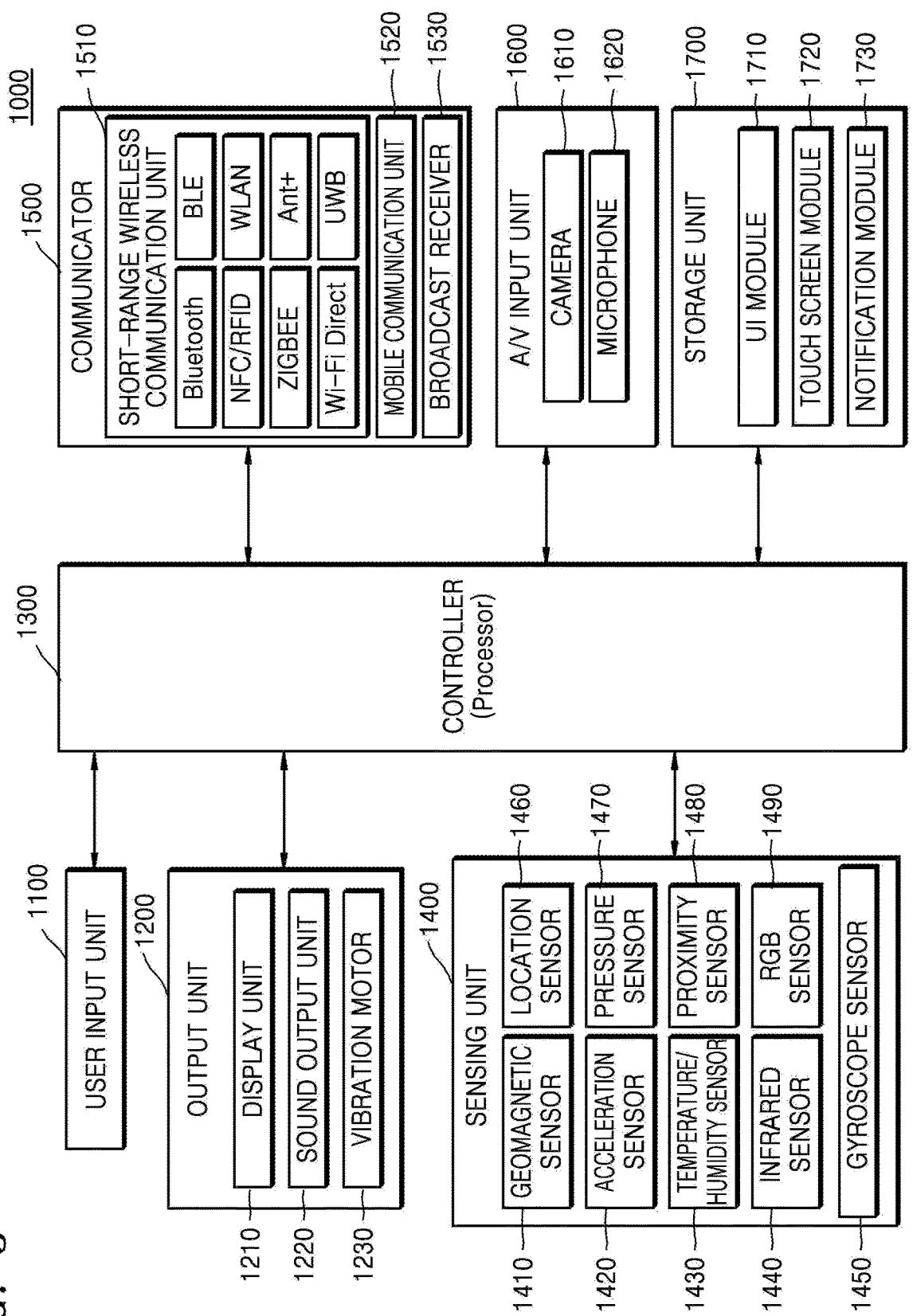

FIGS. 2 and 3 are block diagrams of an electronic device 1000 according to an exemplary embodiment.

As shown in FIG. 2, the electronic device 1000 includes a display unit 1210 and a controller 1300. However, all of elements shown in FIG. 2 are not indispensable elements of the electronic device 1000. The electronic device 1000 may be embodied by more elements than as shown in FIG. 2 or less elements than as shown in FIG. 2.

In general, the controller 1300 controls overall operations of the electronic device 1000 to perform a function of the electronic device 1000.

In detail, the controller 1300 acquires music information about music that is played in the electronic device 1000 or an electronic device separate from the electronic device 1000.

When music is played in the electronic device 1000, the music may be output through a sound output unit 1220 of the electronic device 1000. Here, an audio file of the music may be pre-stored in a storage unit 1700 of the electronic device 1000 or may be received from an external server through a communicator 1500 of the electronic device 1000 to be played.

The music information may be pre-stored in the storage unit 1700 of the electronic device 1000 or may be received and acquired from an external server through the communicator 1500 of the electronic device 1000.

The music information may be a filename of an audio file of music. When meta-information of the audio file is not recorded, the filename of the audio file itself may be used as music information to acquire a storyline of the music.

The music information may be meta-information of an audio file of music. The meta-information may include information about at least one selected from among a title, a singer, a songwriter, a lyric writer, a player, a genre, a play time, an album, segments, lyrics, and a description of the music. The meta-information of the audio file may be searched and acquired by searching a search engine or the like based on a filename and/or preexisting meta-information of the audio file. Here, the search engine may provide meta-information of an audio file in response to a query.

The music information may be lyric information corresponding to an audio file of music. When the audio file is played, the electronic device 1000 may load lyric information corresponding to the audio file and display lyrics included in the lyric information.

The lyric information may be acquired from a lyric file of a LyRiC (LRC) extension. The lyric information may include information associated with start times of each of sentences of lyrics. When an audio file is played and lyric information corresponding to the audio file are loaded, the electronic device 1000 may be embodied that each of sentences included in the lyric information are scrolled and displayed based on start times of each of the sentences. Here, lyrics of music may be displayed together with the audio file, and thus a user may easily understand lyrics of music that is being played.

Music information may be audio fingerprint information of music. The audio fingerprint information of the music may refer to information about characteristics of the music and may be used to identify and/or search for music.

When music is played in the electronic device 1000, the electronic device 1000 may analyze an audio file to acquire audio fingerprint information.

When music is played in an electronic device separate from the electronic device 1000, the electronic device 1000 may record the music through a microphone 1620 to generate audio data and analyze an audio signal of the generated audio data to acquire audio fingerprint information.

In detail, audio fingerprint information may be acquired by using a power spectrum that is generated after an audio signal is converted into a frequency domain by using a Fast Fourier Transform (FFT) method. However, the audio fingerprint information is not limited thereto and thus may be acquired through various methods.

The electronic device 1000 may transmit the acquired audio fingerprint information to an audio database (DB) and acquire meta-information of an audio file identified by DB matching in the audio DB. Here, the audio DB may be stored in the storage unit 1700 of the electronic device 1000 or in an external server and may include audio fingerprint information and meta-information of various types of audio files. Meta information of an audio file may include information about at least one selected from among a title, a singer, a songwriter, a lyric writer, a player, a genre, a play time, an album, music segments, lyrics, and a description of music recorded in the audio file.

The controller 1300 acquires a storyline of played music, based on the acquired music information.

A storyline of music refers to a narrative description of the music and may include one or more images, one or more videos, and/or texts for the narrative description.

The storyline of the music may be pre-stored in the storage unit 1700 of the electronic device 1000 or may be received and acquired from an external server through the communicator 1500 of the electronic device 1000.

A storyline of music may be searched and acquired by searching a search engine or the like based on meta-information of an audio file of the music. Here, the search engine may provide the storyline of the music in response to a query.

The controller 1300 acquires one or more images based on the acquired storyline.

The one or more images may be pre-stored in the storage unit 1700 of the electronic device 1000 or may be received and acquired from an external server through the communicator 1500 of the electronic device 1000.

When a storyline of music includes one or more images, an image associated with the music may be acquired from the one or more images included in the storyline of the music.

When a storyline of music includes one or more videos, an image associated with the music may be acquired from frames constituting the one or more videos included in the storyline of the music. A method of acquiring an image associated with music from frames constituting the one or more videos included in a storyline of the music through the electronic device 1000 is described later with reference to FIG. 4.

When a storyline of music includes texts, an image associated with music may be acquired based on the texts included in the storyline of the music. A method of acquiring an image associated with music from texts included in a storyline of the music through the electronic device 1000 is described later with reference to FIG. 5.

The display unit 1210 may display acquired one or more images.

An image acquired based on a storyline of music may be displayed through the display unit 1210 of the electronic device 1000 so as to enable the user enjoying the music to further deeply understand the music. Also, abundant visual and auditory experiences may be given to the user.

All of elements shown in FIG. 2 are not indispensable elements of the electronic device 1000. The electronic device 1000 may be embodied by more elements than as shown in FIG. 2 or less elements than as shown in FIG. 2. For example, as shown in FIG. 3, the electronic device 1000 according to an exemplary embodiment may further include a user input unit 1100, an output unit 1200, a sensing unit 1400, the communicator 1500, an audio/video (NV) input unit 1600, and the storage unit 1700 in addition to the display unit 1200 and the controller 1300 described above.

Elements of the electronic device 1000 will now be described in detail.

The user input unit 1100 refers to a unit through which a user inputs data to control the electronic device 1000. For example, the user input unit 1100 may be a key pad, a dome switch, a touch pad (including a contact type capacitive touch pad, a pressure-type resistive overlay touch pad, an infrared sensor type touch pad, a surface ultrasonic conductive touch pad, an integral-equation tension measuring type touch pad, a piezo-effect type touch pad, etc.), a jog wheel, a jog switch, or the like but is not limited thereto. In particular, when the touch pad form a touch screen or a touch screen display with the display unit 1210 in a layer structure, the user input unit 1100 may be used as not only an input device but also an output device.

The touch pad may be embodied to detect a real touch and a proximity touch. For convenience of description, the real touch and the proximity touch may be all referred to as "touches".

The real touch used herein refers to an input occurring when a pointer is physically touched on a screen. The proximity touch refers to an input occurring when a pointer is close to a screen in preset distance but not physically touched.

The pointer used herein refers to a tool for performing a real touch or a proximity touch on a particular part of a displayed screen. For example, the pointer may be a stylus pen, a finger, or the like.

The output unit 1200 may output an audio signal, a video signal, or a vibration signal and may include the display unit 1210, a sound output unit 1220, and a vibration motor 1230.

The display unit 1210 displays information processed in the electronic device 1000. For example, the display unit 1210 may display a screen of an operating system (OS) driven in the electronic device 1000, a screen of an application driven in the OS, or the like.

When the display unit 1210 forms a touch screen or a touch screen display with a touch pad in a layer structure, the display unit 1210 may be used as not only an output device but also an input device. The display unit 1210 may include at least one selected from among a liquid crystal display (LCD), a thin film transistor LCD (TFT-LCD), an organic light-emitting diode (OLED), a flexible display, a 3-dimensional (3D) display, and an electrophoretic display. Also, the electronic device 1000 may include two or more display units 1210 according to a realization type of the electronic device 1000. Here, the two or more display units 1210 may be disposed to face each other by using a hinge.

The sound output unit 1220 outputs audio data received from the communicator 1500 or stored in the storage unit 1700. The sound output unit 1220 also outputs a sound signal associated with a function performed in the electronic device 1000. The sound output unit 1220 may include a speaker, a buzzer, or the like.

The vibration motor 1230 may output a vibration signal. For example, the vibration motor 1230 may output a vibration signal corresponding to an output of audio data or video data. The vibration motor 1230 may also output the vibration signal when a touch is input on a touch screen.

The controller 1300 may control overall operations of the electronic device 1000 to perform the function of the electronic device 1000. For example, the controller 1300 may execute programs stored in the storage unit 1700 to control the user input unit 1100, the output unit 1200, the sensing unit 1400, the communicator 1500, the A/V input unit 1600, etc.

The sensing unit 1400 may sense a state of the electronic device 100 or an ambient state of the electronic device 1000 and transmit a result of sensing the state or ambient state of the electronic device 2000 to the controller 1300.

The sensing unit 1400 may include at least one selected from among a magnetic sensor 1410, an acceleration sensor 1420, a temperature/humidity sensor 1430, an infrared sensor 1440, a gyroscope sensor 1450, a location sensor (e.g., a GPS) 1460, a pressure sensor 1470, a proximity sensor 1480, and a RGB sensor (e.g., an illuminance sensor) 1490 but is not limited thereto. Functions of respective sensors may be intuitively inferred by those of ordinary skill in the art based on the names of the sensors, and thus a detailed description thereof is omitted.

The communicator 1500 may include one or more elements that enable the electronic device 1000 to communicate with an external device. For example, the communicator 1500 may include a short-range wireless communication unit 1510, a mobile communication unit 1520, and a broadcast receiver 1530.

The short-range wireless communication unit 1510 may include a Bluetooth communicator, a Bluetooth low energy (BLE) communicator, a near-field communication (NFC) unit, a wide local area network (WLAN)/Wi-Fi communication unit, a zigbee communicator, an infrared data association (IrDA) communicator, a Wi-Fi direct (WFD) communicator, an ultra wideband (UWB) communicator, an Ant+ communicator, etc. but is not limited thereto.

The mobile communication unit 1520 transmits and receives with at least one selected from among a base station, an external terminal, and a server on a mobile communication network. Here, a wireless signal may include various types of data according to transmissions and receptions of a sound signal, a video call signal, or a text/multimedia message.

The broadcast receiver 1530 receives a broadcast signal and/or broadcast-related information from an external source through a broadcast channel. A broadcast channel may include a satellite channel, a terrestrial channel, etc. According to exemplary embodiments, the electronic device 1000 may not include the broadcast receiver 1530.

The A/V input unit 1600 inputs an audio signal or a video signal and may include a camera 1610, a microphone 1620, etc. The camera 1610 may acquire a still image or an image frame of a video through an image sensor in a video call mode or a photographing mode. An image captured through the image sensor may be processed through the controller 1300 or an additional image processor.

An image frame processed by the camera 1610 may be pre-stored in the storage unit 1700 or may be transmitted to an outside through the communication unit 1500. Two or more cameras 1610 may be included according to a type of the electronic device 1000.

The microphone 1620 receives an external sound signal and processes the external sound signal as electric voice data. For example, the microphone 1620 may receive a sound signal from an external device or a speaker. The microphone 1620 may use various types of noise removal algorithms for removing noise occurring when receiving the external sound signal.

The storage unit 1700 may store a program for processing and controlling the controller 1300 and data input into the electronic device 1000 or output from the electronic device 1000.

The storage unit 1700 may include at least one type of storage medium selected from among a flash memory type, a hard disc type, a multimedia card micro type, a card type memory (e.g., a SD or XD memory or the like), a random access memory (RAM), a static RAM (SRAM), a read only memory (ROM), electrically erasable programmable ROM (EEPROM), a programmable ROM (PROM), a magnetic memory, a magnetic disc, and an optical disc. The storage unit 1700 may also be referred to as a memory.

Programs stored in the storage unit 1700 may be classified into a plurality of modules according to their functions, e.g., may be classified into a user interface (UI) module 1710, a touch screen module 1720, and a notification module 1730, etc.

The UI module 1710 may provide a UI, graphical UI (GUI), or the like that operate along with the electronic device 100 and is specialized for each application. The touch screen module 1720 may sense a touch gesture of the user on a touch screen and transmit information about the touch gesture to the controller 1300. According to an exemplary embodiment, the touch screen module 1720 may recognize and analyze a touch code. The touch screen module 1720 may be formed as additional hardware including a controller.

Various types of sensors may be employed inside or around a touch pad so as to enable the touch pad to sense a touch of the user. An example of these various types of sensors may include a tactile sensor. The tactile sensor refers to a sensor that senses a contact of a particular object as people do, or more sensitively than people do. The tactile sensor may sense various types of information such as roughness of a contacted surface, hardness of a contacted object, a temperature of a contacted point, etc.

Also, an example of these various types of sensors may include a proximity sensor 1480. The proximity sensor 1480 refers to a sensor that detects whether there is an object approaching a preset detection surface or an object existing around the preset detection surface, by using a force of an electromagnetic field or infrared rays without a mechanical contact. Examples of the proximity sensor 1480 may include a transmission photosensor, a direct reflection photosensor, a mirror reflection photosensor, a high-frequency oscillation-type proximity sensor, a capacitive proximity sensor, a magnetic proximity sensor, an infrared proximity sensor, etc.

Also, an example of these various types of sensors includes a force touch sensor. The electronic device 1000 may perform different functions according to a size of a force touching a touch pad to further diversify a gesture input that may be applied through the touch pad.

The gesture input may be embodied in various methods. Among these various methods, "tap" refers to an input method of touching a pointer on a touch pad and then releasing the pointer from the touch pad. "Double tap" refers to an input method of applying a tap two times within a preset time, and "multiple tap" refers to an input method of applying a tap three times with in a preset time. "Long tap" refers to an input method of keeping a touch state until a preset time passes or a particular event occurs. Also, "drag" refers to a gesture of moving a pointer on the touch pad after the pointer is contacted to the touch pad. "Swipe" basically functions like "drag" but, a movement speed of "swipe" is relatively faster than a movement speed of "drag".

The notification module 1730 may generate a signal for notifying the user of an occurrence of an event of the electronic device 1000. Examples of the event occurring in the electronic device 1000 may include a signal reception, a message reception, a key signal input, a schedule notification, etc. The notification module 1730 may output a notification signal in a video signal form through the display unit 1210, in an audio signal form through the sound output unit 1220, and in a vibration signal form through the vibration motor 1230.

Some or all of the elements of the electronic device 1000 of FIGS. 2 and 3 may be embodied by at least one hardware processor. For example, some or all of the elements of the electronic device 1000 may be embodied through an additional processor besides a main processor of the electronic device 1000.

Also, some of the elements of the electronic device 1000 of FIGS. 2 and 3 may be embodied by at least one software program. For example, some functions of the electronic device 1000 may be realized by an OS program, and some functions of the electronic device 1000 may be realized by an application program. Therefore, functions of the electronic device 1000 may be realized by at least one hardware and at least one software, and the functions of the electronic device 1000 embodied by the software may be executed by an OS and an application installed in the electronic device 1000.

According to an exemplary embodiment, the electronic device 1000 may include a processor, a memory that stores program data, a permanent storage such as a disc drive, a communication port that communicates with an external device, a UI unit such as a touch panel, a key, a button, or the like, etc. Methods that are embodied as software modules or algorithms may be stored on a computer-readable recording medium as computer-readable codes or program commands executed on the processor. Example, the computer-readable recording medium includes a magnetic storage medium (e.g., an ROM, an RAM, a floppy disc, a hard disc, or the like), an optical reading medium (e.g., a CD-ROM, a digital versatile disc (DVD), or the like), etc. The computer-readable recording medium can be distributed among computer systems that are interconnected through a network, and the inventive concept may be stored and implemented as computer readable code in the distributed system. Data or a program stored in the computer-readable recording medium can be read by a computer, stored in a memory, and executed by a processor.

Figure 4:
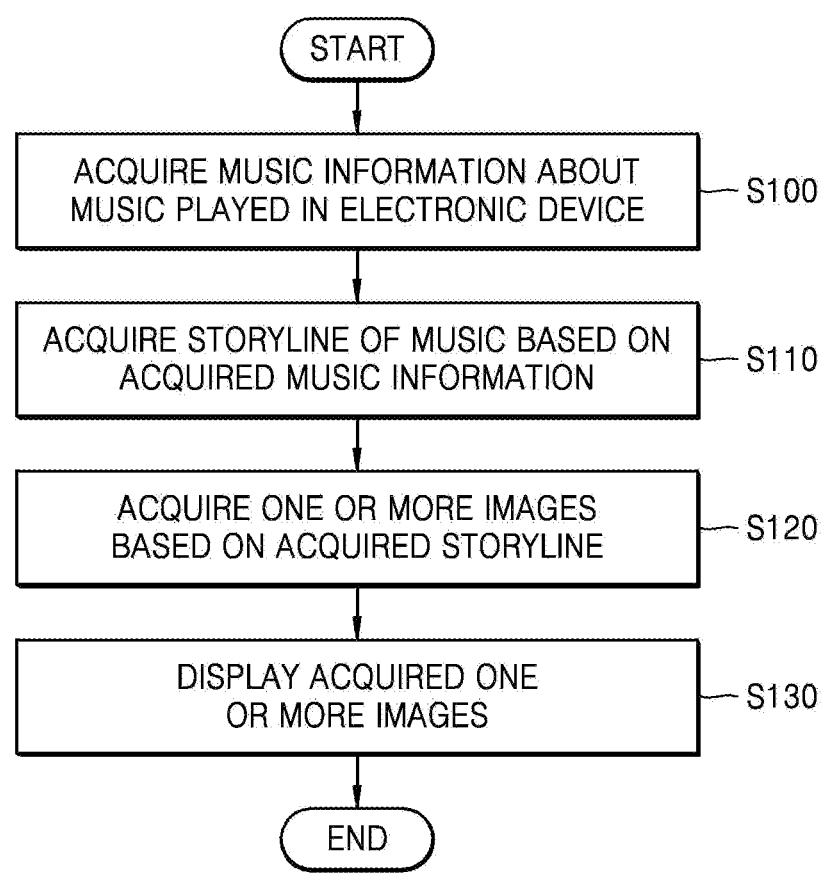
FIG. 4 is a flowchart of a method of displaying an image associated with music when the music is played in an electronic device, according to an exemplary embodiment.

FIG. 4 is a flowchart of a method of displaying an image associated with music when the music is played in an electronic device, according to an exemplary embodiment;

For convenience, the method is described with reference to FIG. 1. Referring to FIG. 1, the multimedia play application 100 may be driven in the electronic device to play music. Here, the play of the music refers to a play of an audio file of the music.

In operation S100, the electronic device acquires music information about music played in the electronic device.

The music information may be pre-stored in the electronic device or may be received and acquired from an external server through the Internet or the like.

The music information may be meta-information of an audio file of the music. The meta-information may include information about at least one selected from among a title, a singer, a songwriter, a lyric writer, a player, a genre, a play time, an album, music segments, lyrics, and a description of the music.

For example, as shown in the information window 130 of FIG. 1, the electronic device may acquire a singer and a title (MOBB-Chenzao) of the music. The electronic device may acquire various types of meta-information that are not shown in the information window 130, besides the singer and the title of the music.

The electronic device may be embodied to acquire music information about music played in a different electronic device from the electronic device.

The music information may be audio fingerprint information, and the electronic device may record the music to generate audio data and analyze an audio signal of the generated audio data to acquire audio fingerprint information.

In operation S110, the electronic device acquires a storyline of the music based on the music information acquired in operation S100.

The storyline of the music may include one or more images, one or more videos, and/or texts.

The storyline of the music may be pre-stored in the electronic device or may be received and acquired from the external server through the Internet or the like.

The storyline of the music may be searched and acquired by a search engine or the like based on the meta-information of the audio file of the music. Here, the search engine may provide the storyline of the music in response to a query. For example, the search engine may provide a music video of the music in response to the query.

Referring to FIG. 1, the electronic device may acquire a video associated with the music, e.g., a music video, based on the signer and the tile (MOBB-Chenzao) of the music. In other words, the storyline of the music includes the music video of the music.

In operation S120, the electronic device acquires one or more images based on the storyline acquired in operation S110.

The one or more images may be pre-stored in the electronic device or may be received and acquired from the external server through the Internet or the like.

When the storyline of the music includes one or more videos, an image associated with the music may be acquired from frames of the one or more videos constituting the storyline.

For example, referring to FIG. 1, the electronic device may acquire one or more images from frames constituting the music video. Here, the electronic device may acquire one or more images from the frames constituting the music video at preset time intervals. For example, the electronic device may acquire one or more images from the frames constituting the music video at 10 second intervals. As shown in the information window 130 of FIG. 1, when a play time of music played in the electronic device is 3:59, and a play time of a music video of the music is also 3:59, the electronic device may acquire a first frame at 0:00, a second frame at 0:10, a third frame at 0:20, . . . , and twenty fourth frame at 3:50.

In operation S130, the electronic device displays the one or more images acquired in operation S120.

For example, referring to FIG. 1, the electronic device may display the acquired images 110A, 110B, 110C, and 110D.

The electronic device may be embodied to display the acquired images 110A, 110B, 110C, and 110C according to played music. For example, frames that are acquired from a music video at preset time intervals may be displayed at the preset time intervals in frame order in the electronic device.

For example, referring to FIG. 1, when a play time of music played in the electronic device is 3:59, and 10 seconds elapse after playing the music, a second frame at 0:10 of a music video may be displayed in the electronic device. Therefore, as shown in the information window 130, the second frame 110A of the music video may be on display at play time 0:12. Similarly, the fifth frame 110B, the thirteenth frame 110C, and the eighteenth frame 110D of the music video may be respectively on display at play times 0:46, 1:51, and 2:33.

When a play time of the music is different from a play time of the music video of the music, the electronic device may display images based on a ratio between the two play times. For example, when the play time of the music video is 7:58 that doubles the play time 3:59 of the music, the electronic device may display frames, which are acquired from the music video at 10 second intervals, at 5 second intervals.

The electronic device may play music and display an image associated with the music. Therefore, resources of the electronic device may be less consumed than playing a video associated with the music. Also, when the electronic device is connected to the Internet through a mobile communication network to stream and play music or an image, a burden of data usage on a user may be lightened.

Figure 5:
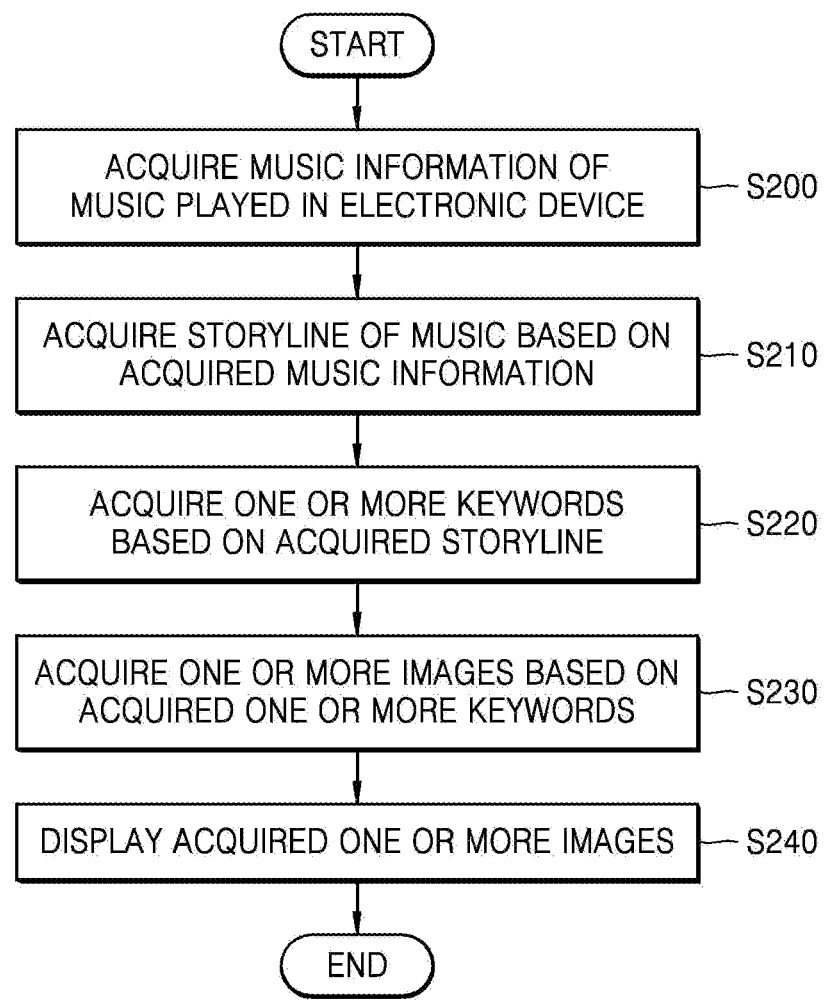
FIG. 5 is a flowchart of a method of displaying an image acquired by using a keyword included in a storyline of the music when the music is played in an electronic device according to an exemplary embodiment.

FIG. 5 is a flowchart of a method of displaying an image acquired by using a keyword included in a storyline of the music when the music is played in an electronic device according to an exemplary embodiment;

For convenience, the method is described with reference to FIG. 6.

Figure 6:
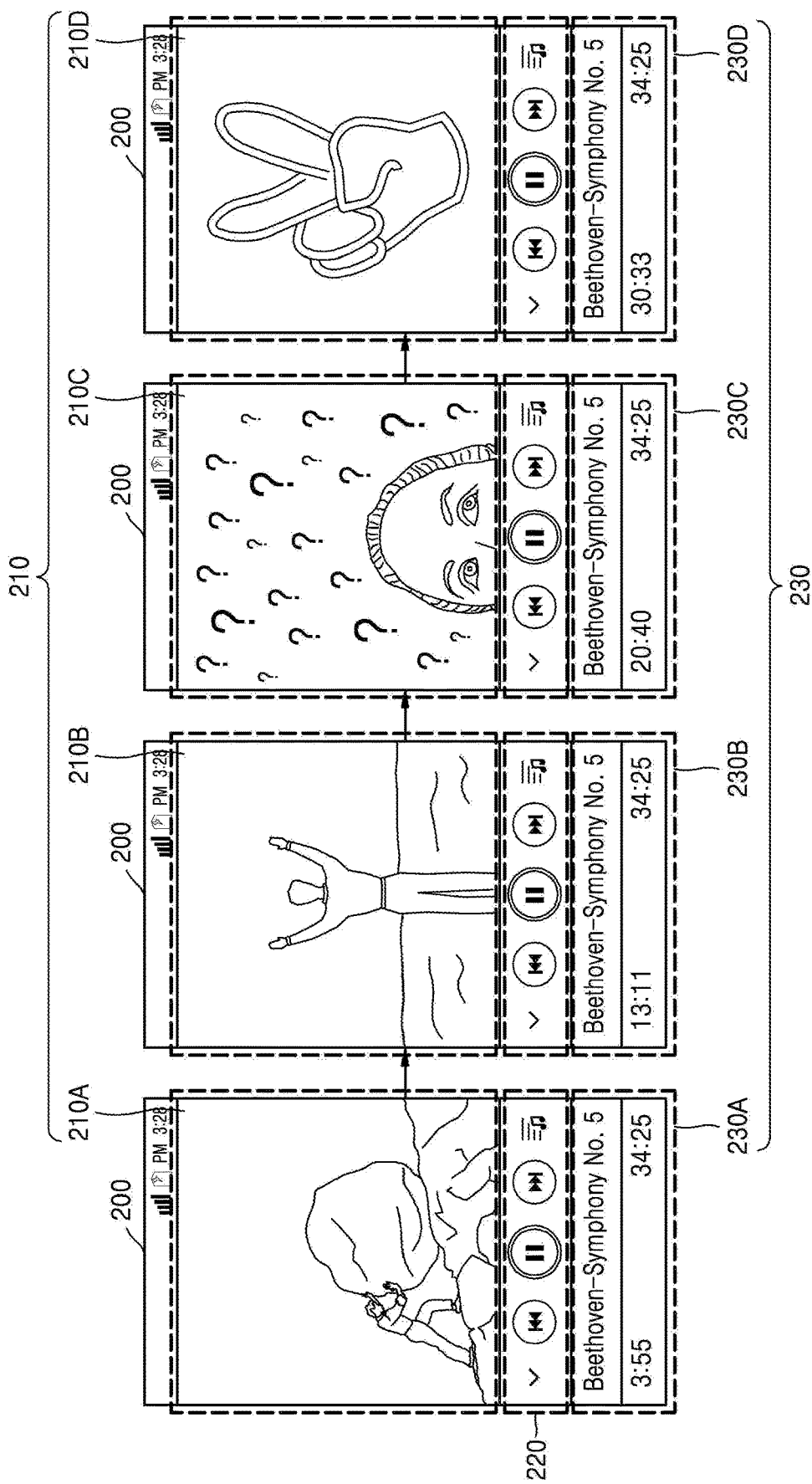
FIG. 6 is a diagram illustrating an example of a displayed image acquired by using descriptions of music when the music is played in an electronic device, according to an exemplary embodiment.

FIG. 6 is a diagram illustrating an example of a displayed image acquired by using descriptions of music when the music is played in an electronic device, according to an exemplary embodiment;

Operations S200, S210, S230, and S240 are respectively similar to operations S100, S110, S120, and S130 described above with reference to FIG. 4, and thus their repeated descriptions are omitted.

In operation S200, the electronic device acquires music information about music played in the electronic device.

The music information may be meta-information of an audio file of the music. The meta-information may include at least one selected from among a title, a singer, a songwriter, a lyric writer, a player, a genre, a play time, an album, music segments, lyrics, and a description of the music.

For example, as shown in an information window 230 of FIG. 6, the electronic device may acquire a songwriter and a title (Beethoven-Symphony No. 5) of the music. The electronic device may acquire various types of meta-information that are not shown in the information window 230, besides the singer and the title of the music.

In operation S210, the electronic device acquires a storyline of the music based on the music information acquired in operation S200.

The storyline of the music may include one or more images, one or more videos, and/or texts.

The storyline of the music may be pre-stored in the electronic device or may be received and acquired from an external server through the Internet or the like.

The storyline of the music may be stored as meta-information of an audio file of the music. The storyline of the music may include a description and/or lyrics of the music among information included in the meta-information.

For example, the electronic device may acquire various types of meta-information that are not shown in the information window 230, besides the signer and the tile (Beethoven-symphony No. 5) of the music and acquire a description of the music from the acquired meta-information. Here, the description of the music may include descriptions of music segments constituting the music.

The music segments may be parts that are musically distinguished from one another in one piece of music, i.e., parts that are distinguished from one another according to musical forms.

For example, popular music may be generally divided into music segments such as intro, verse, pre-chorus, chorus, bridge, outro, sabi, hook, ad lib, humming, scat, etc.

For example, a symphony may be generally divided into four movements, each of which may have a sonata allegro form of a fast tempo, an ABA or theme and variation form of a slow tempo, a minuet or scherzo form of a middle/fast tempo, a sonata or rondo form of a fast tempo, or the like. Also, each of the four movements may be divided into a plurality of sections. Music segments of a symphony may be respective movements or sections of the symphony.

Beethoven's Fifth Symphony may be divided into four movements that may correspond to four music segments. Music segment information included in meta-information may include information about start times of respective music segments. For example, when a total play time of an audio file of the Beethoven's Fifth Symphony is 34:25, a first movement of the audio file starts at 00:00, a second movement of the audio file starts at 8:25, a third movement of the audio file starts at 16:00, and a fourth movement of the audio file starts at 24:44, start times of music segments may be respectively 00:00, 8:25:, 16:00, and 24:44.

Four movements respectively have bynames "Struggle", "Hope", "Doubt", and "Victory". Therefore, a storyline of the Beethoven's Fifth Symphony may include descriptions of the four movements and bynames of the four movements.

When a storyline of music includes a description of the music and/or lyrics of the music, the storyline includes text.

A storyline of music may be searched and acquired by a search engine or the like based on music information of the music, e.g., meta-information of an audio file of the. Here, the search engine may provide a description of the music and/or lyrics of the music in response to a query. Therefore, the electronic device may acquire the description of the music and/or the lyrics of the music provided from the search engine.

When the search engine provides various types of contents besides the description of the music and/or the lyrics of the music in response to the query, the electronic device may be embodied to select the storyline of the music from the various types of contents based on a preset condition.

For example, the preset condition may be an order between the contents. In other words, among the various types of contents, a content highest rated by the search engine may be selected as a storyline of music.

For example, the preset condition may be the number of times that a content is repeatedly provided or a repeatedly provided ratio. In other words, a content that is most repeatedly provided by the search engine may be selected as a storyline of music.

The electronic device may select a storyline of music from a plurality of search engines. Also, the electronic device may be embodied to select a storyline of music from contents provided from a plurality of search engines based on a preset condition. For example, the preset condition may be the number of times a content is repeatedly provided or a repeatedly provided ratio. In other words, a content that is most repeatedly provided by a plurality of search engines may be selected as a storyline of music.

The electronic device may select a storyline of music from various types of contents based on a combination of the above-described conditions.

In operation S220, the electronic device acquires one or more keywords based on the storyline acquired in operation S210.

When a storyline of music includes a description of the music and/or lyrics of the music, the storyline includes texts.

A storyline including texts may be analyzed to acquire a keyword. According to the analysis result of the storyline, a keyword may be selected based on a part of speech of a word, the number of appearances of the word, a context, etc. For example, a noun, a verb, and/or a frequently used word may be selected as a keyword from the storyline, but the keyword is not limited thereto. Therefore, the keyword may be selected based on various criteria.

The electronic device may acquire one or more keywords based on a storyline including texts. For example, Beethoven's Fifth Symphony is played in the electronic device, the electronic device may acquire keywords "Struggle", "Hope", "Doubt", and "Victory" from the acquired storyline of the Beethoven's Fifth Symphony.

In operation S230, the electronic device acquires one or more images based on the keywords acquired in operation S220.

The one or more images may be pre-stored in the electronic device or may be received and acquired from an external server through the Internet or the like.

When the one or more images are pre-stored in the electronic device, a plurality of images may be stored in an image database (DB) of a storage unit of the electronic device, and thus the one or more images may be acquired from the image DB based on a keyword. Here, the image DB may store an image, a title of the image, and a description of the image, etc. The electronic device may search the image DB by using an acquired keyword. The electronic device may acquire one or more images having titles or descriptions matching with a keyword according to the search result of the image DB.

When one or more images are acquired from the external server through the Internet or the like, the electronic device may acquire the one or more images by using a search engine. Here, the search engine may provide images in response to a query that is based on each of the acquired keywords.

Referring to FIG. 6, four images 210A, 210B, 210C, and 210D, which respectively correspond to the keywords "Struggle", "Hope", "Doubt", and "Victory" acquired in operation S220, may be acquired.

In operation S240, the electronic device displays the images acquired in operation S230.

For example, referring to FIG. 6, the electronic device may display the acquired four images 210A, 210B, 210C, and 210D.

The electronic device may be realized to may be embodied to display the acquired four images 210A, 210B, 210C, and 210D according to the played music. For example, a total play time of the played music may be divided into four time ranges to respectively display the four images 210A, 210B, 210C, and 210D in each of the four time ranges.

The electronic device may be embodied to display the acquired four images 210A, 210B, 210C, and 210D according to music segments of the played music. Here, the music segments of the played music may respectively correspond to the acquired four images 210A, 210B, 210C, and 210D. When one of the music segments is played, an image corresponding to the played music segment may be displayed. In other words, an image corresponding to a first music segment may be displayed for a time range from a start time of the first music segment to a start time of a second music segment positioned next to the first music segment.

The electronic device may acquire and display an image by using a storyline including text. Therefore, the user may further easily understand music, and the electronic device may acquire and display an image by using text, and thus resources of the electronic device may be saved.

Figure 7:
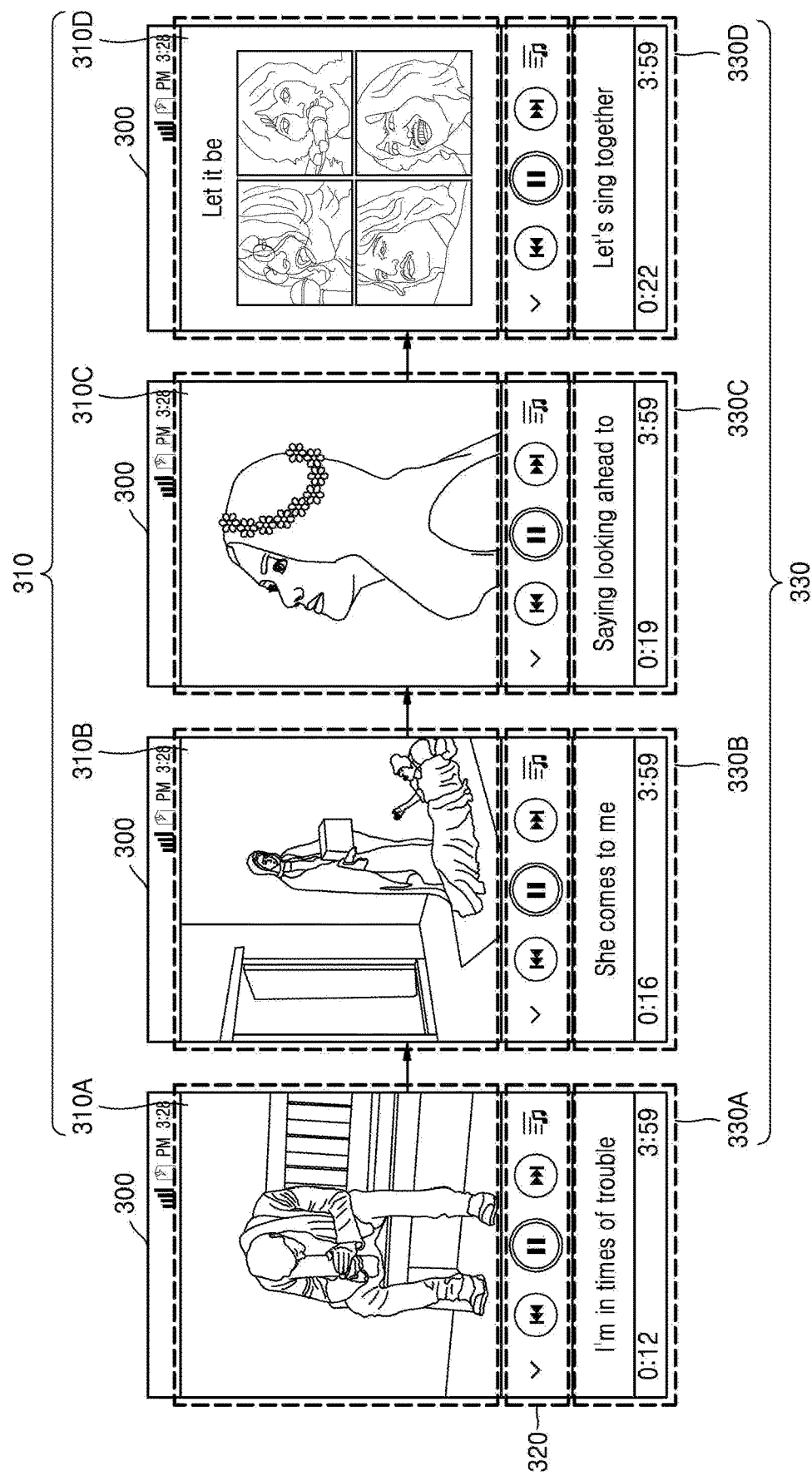
FIG. 7 is a diagram illustrating an example of a displayed image acquired by using lyrics of the music when the music is played in an electronic device, according to an exemplary embodiment.

FIG. 7 is a diagram illustrating an example of a displayed image acquired by using lyrics of the music when the music is played in an electronic device, according to an exemplary embodiment.

A storyline of music may be searched and acquired by a search engine or the like based on music information of the music, e.g., meta-information of an audio file of the music. Here, the search engine may provide a description of the music and/or lyrics of the music in response to a query. Therefore, the electronic device may acquire the description of the music and/or the lyrics of the music provided from the search engine.

When a storyline of music includes a description of the music and/or lyrics of the music, the storyline includes texts. Here, the storyline may include one or more sentences. The one or more sentences may be distinguished from one another based on a punctuation mark such as a period, a question mark, an exclamation mark or the like or may be distinguished from one another through a grammar analysis.

For example, lyrics of a music "Let's sing together" of a singer called "The Earth" includes sentences such as "I'm in times of trouble", "She comes to me", "Saying looking ahead to", and "Let's sing together".

The sentences of the lyrics may be distinguished from one another through a grammar analysis. For example, the sentences may be distinguished from one another based on verbs included each of the sentences includes.

When a storyline includes a punctuation mark, sentences may be distinguished from one another based on the punctuation mark.

The electronic device may acquire one or more images based on one or more sentences constituting a storyline.

The one or more images may be pre-stored in the electronic device or may be received and acquired from an external server through the Internet or the like.

When the one or more images are pre-stored in the electronic device, a plurality of images may be stored in an image DB of a storage unit of the electronic device. Therefore, the one or more images may be acquired from the image DB based on each of sentences constituting a storyline or a keyword of each of the sentences. Here, the image DB may store an image, a title of the image, a description of the image, etc. The electronic device may search the image DB by using each of sentences constituting a storyline or a keyword of each of the sentences. The electronic device may acquire one or more images having titles or descriptions matching with each of the sentences constituting the storyline or each of the sentences according to the search result of the image DB.

When the electronic device receives and acquires one or more images from the external server through the Internet or the like, the electronic device may acquire the one or more images by using a search engine. Here, the search engine may provide an image in response to a query that is based on each of the sentences constituting the acquired storyline.

Referring to FIG. 7, images 310A, 310B, 310C, and 310D respectively corresponding to sentences constituting lyrics of "Let's sing together" of the singer "The Earth" may be acquired. The electronic device may display the acquired images 310A, 310B, 310C, and 310D.

Meta-information may include lyric information. Therefore, when an audio file is played and lyric information corresponding to the audio file are loaded, the electronic device may be embodied to that each of the sentences included in the lyric information are scrolled and displayed based on a start time of each of the sentences. Also, the electronic device may display images respectively corresponding to the sentences according to the start times of the sentences. Therefore, lyrics of music and an image corresponding to the lyrics may be displayed according to the played music, and thus a user may further easily understand the played music.

According to an exemplary embodiment, one or more sentences constituting a storyline may constitute one or more paragraphs. The electronic device may distinguish the paragraphs from one another based on similarities between the sentences. The similarities between the sentences may be calculated according to a well-known similarity calculation method.

The well-known similarity calculation method may be classified into five categories, i.e., a letter matching method, a term frequency-inverse document frequency (TF-IDF) vector method, a probabilistic method, a sentence structure method, and a semantic extension method. The letter matching method calculates similarity of two sentences according to the number of the same words existing in the two sentences. For example, there is a Jaccard similarity coefficient method. The TF-IDF vector method transforms sentences to TF-IDF vectors and uses cosine values of two vectors as similarity. The probabilistic method employs a language model framework and acquires similarity between two sentences by probability. The sentence structure method divides sentences into different components according to matching approach of a sentence templet and calculates similarity based on structures of the different components.

For example, a similarity value of a first sentence is preset, and a second sentence may have a similarity value depending on similarity calculated by using the first and second sentences. In other words, similarity may be calculated by using a sentence and its previous sentence so as to enable all sentences to have similarity values. The similarity values of the all sentences may constitute a similarity value sequence.

A threshold value may be set for the similarity value sequence. Also, similarity values of the similarity value sequence may be respectively compared with the threshold value. When a similarity value of a sentence is larger than the threshold value, similarity between the sentence and its previous sentence may be determined as being relatively high. When the similarity value of the sentence is lower than the threshold value, a similarity between the sentence and its previous sentence may be determined as being relatively low. When the similarity value of the sentence is lower than the threshold value, the sentence may belong to a next paragraph next to a paragraph including the previous sentence, and become a first sentence of the next paragraph.

The threshold value may be set by a user or a manager of a backend server or may be set to a default value. The default value may be acquired by a statistical method. First, a plurality of pieces of music having various types are selected, storylines of the pieces of music are acquired, and the number of paragraphs of each of the storylines is determined. Then, a similarity value sequence of a storyline including X paragraphs may be acquired, and similarity values included in the similarity value sequence may be listed from small values to large values to set an $X^{th}$ similarity value as a threshold value of the storyline. An average of threshold values of respective storylines may be determined as a default value.

According to an exemplary embodiment, music may be divided into music segments by using the following method. Samples are extracted from music at preset time intervals. For example, the preset time intervals may be 10 ms intervals. Also, characteristics of the extracted samples are analyzed. For example, the characteristics of the samples may include a time domain, a frequency domain characteristic, a basic frequency characteristic, a Mel Frequency Cepstral Coefficients (MFCC) characteristic, etc. The extracted samples are determined to belong to which music segment by using a classification device. For example, the classification device may be a support vector device. A music sample classification technology based on a characteristic of a sample has been studied and applied and thus is not repeatedly described.

Sentences and/or paragraphs of lyrics may be associated with music segments of music based on lyric information and music segment information included in meta-information of the music. The lyric information may include information about start times of each of the sentences constituting the lyrics, and the music segment information may include information about start times of each of the music segments. Therefore, sentences having a start time between start times of two music segments may be associated with the previous one of the two music segment. When lyrics are divided into paragraphs based on the above-described similarity calculation method, the paragraphs may be associated with music segments of the music.

Paragraphs of a storyline of music may be associated with music segments based on another method. For example, paragraphs of popular music may be associated with music segments through the following method. For convenience of description, the popular music may include intro, verse, chorus, and bridge music segments. Since the intro and bridge of popular music generally do not have lyrics, thus the intro music segment and the bridge music segment may not be associated with the paragraphs of the storyline. When a storyline of music includes M paragraphs, the last paragraph of the storyline may be associated with a chorus music segment of popular music, and M−1 paragraphs (except the last paragraph from M paragraphs) from the storyline may be associated with a verse music segment.

A music segment may be divided into sub segments. For example, in the above-described example, the verse music segment may be divided into sub segments. Samples are extracted from the verse music segment at preset time intervals. For example, the preset time intervals may be 10 ms intervals. All samples extracted from the verse music segment may constitute a sample sequence.

For example, when a similarity value of a first sample is preset, a second sample may have a similarity value based on similarity that is calculated by using the first and second samples. In other words, a similarity may be calculated by using a sample and its previous sample so as to enable all samples to have similarity values. The similarity values of the all samples may constitute a sample similarity value sequence.

Sample similarity values of the sample similarity value sequence may be listed from small values to large values so as to enable an M−1$^{th}$ sample similarity value to be set to a threshold value. The threshold value may be set by the user or a manager of a backend server or may be set to a default value. The sample similarity values of samples may be compared with the threshold value to divide a verse music segment into M−1 sub segments. For example, when a sample similarity value of a sample is larger than the threshold value, similarity between the sample and its previous sample may be determined as being relatively high. When the sample similarity value of the sample is lower than the threshold value, similarity between the sample and its previous sample may be determined as being relatively low. When the sample similarity value of the sample is lower than the threshold value, the sample may belong to a next sub segment next to a sub segment including the previous sample, and becomes a first sample of the next sub segment. M−1 sub segments may be associated with M−1 paragraphs.

The electronic device may sequentially play music segments of music. When a music segment is played, the electronic device may display images respectively corresponding to sentences included in a paragraph associated with the music segment. Since intro and bridge of popular music generally do not have lyrics, an intro music segment and a bridge music segment may not be associated with a paragraph of a storyline. When a music segment that is not associated with a paragraph of a storyline is played as described above, a default image may be displayed. The default image may be an album cover of played music.

Music may be divided into music segments, each of the music segments may be divided into sub segments. When the sub segments is played, images corresponding to the sub segments may be displayed. Therefore, when music is played, an image may be delicately and elaborately displayed, and a user's understanding of the music may be further promoted.

Figure 8:
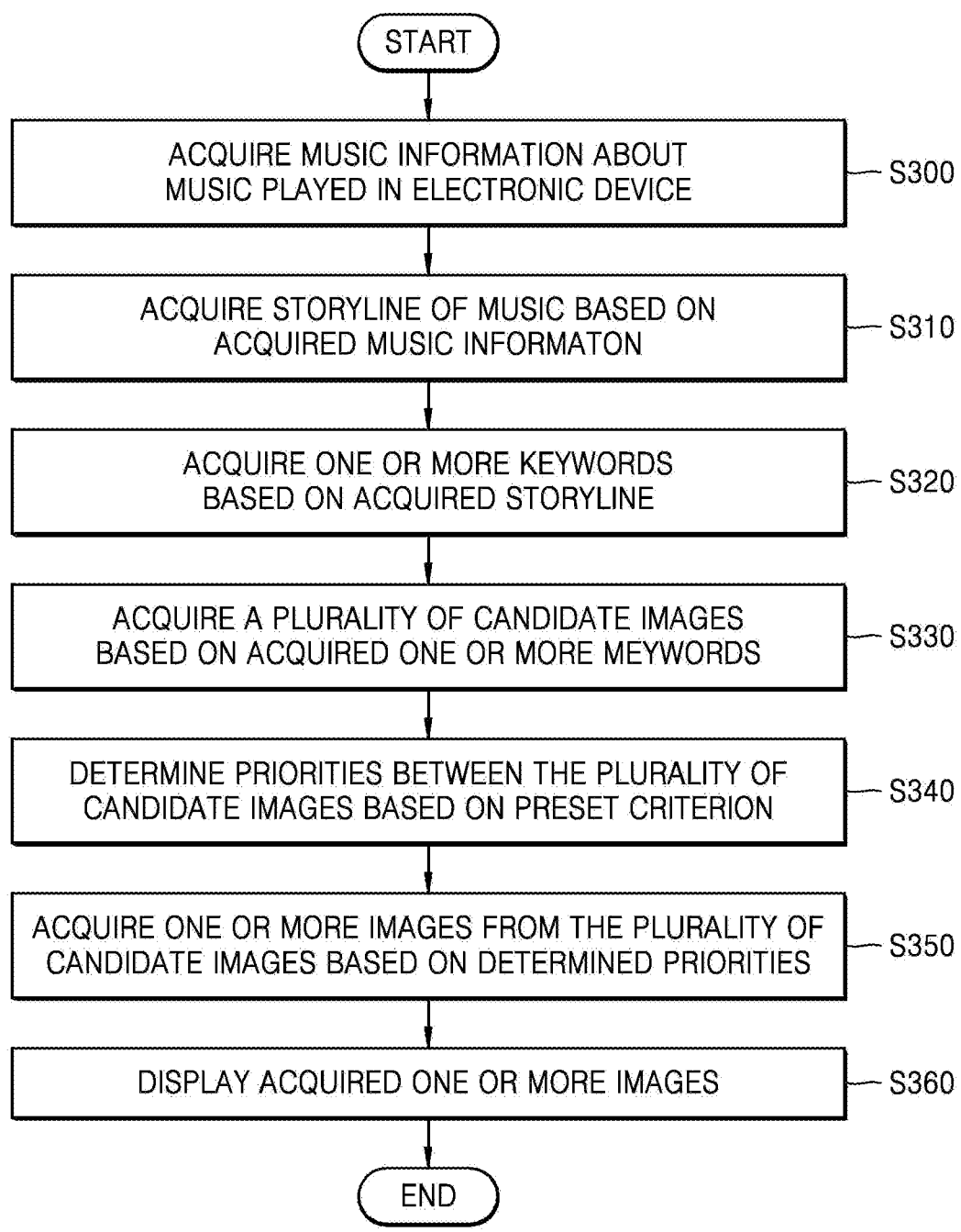
FIG. 8 is a flowchart of a method of displaying an image acquired by using a plurality of candidate images associated with music when the music is played in an electronic device, according to an exemplary embodiment.

FIG. 8 is a flowchart of a method of displaying an image acquired by using a plurality of candidate images associated with music when the music is played in an electronic device, according to an exemplary embodiment.

Operations S300, S310, S320, S330, and S360 are similar to operations S200, S210, S220, S230, and S240 of FIG. 5, and thus their repeated descriptions are omitted.

In operation S300, the electronic device acquires music information about music played in the electronic device.

In operation S310, the electronic device acquires a storyline of the music based on the music information acquired in operation S300.

In operation S320, the electronic device acquires one or more keywords based on the storyline acquired in operation S310.

In operation S330, the electronic device acquires a plurality of candidate images based on the one or more keywords acquired in operation S320.

The electronic device may acquire a plurality of candidate images corresponding to one keyword.

The plurality of candidate images may be pre-stored in the electronic device or may be received and acquired from an external server through the Internet or the like.

When the plurality of candidate images are received and acquired from the external server through the Internet or the like, the electronic device may acquire the plurality of candidate images by using a search engine. Here, the search engine may provide the plurality of candidate images in response to a query that is based on a keyword.

The electronic device may acquire the plurality of candidate images from a plurality of search engines.

In operation S340, the electronic device, based on a preset criterion, determines priorities between the plurality of candidate images acquired in operation S330.

For example, the preset criterion may be orders between the plurality of candidate images. In other words, among the plurality of candidate images, a candidate image highly rated by the search engine has a higher priority than lowly rated one.

For example, the preset criterion may be the number of times that a candidate image is repeatedly provided or a repeatedly provided ratio of the candidate image. In other words, one of the plurality of candidate images that is more repeatedly provided (or provided with a higher frequency) by the search engine has a higher priority.

For example, the preset criterion may be a similarity between a candidate image and a keyword. Through a semantic analysis, semantic information about a meaning of the candidate image may be acquired through a sematic analysis, and a similarity between the semantic information and the keyword may be determined. The semantic analysis and a similarity comparison have been well studied and applied and thus are not described herein.

When the electronic device acquires the plurality of candidate images from the plurality of search engines, the electronic device may be embodied to determine, based on a preset criterion, priorities between the plurality of candidate images provided from the plurality of search engines. For example, the preset criterion may be the number of times that a candidate image is repeatedly provided or a repeatedly provided ratio of the candidate image. In other words, a candidate image that is more repeatedly provided by the plurality of search engines has a higher priority.

The electronic device may determine the priorities between the plurality of candidate images based on a combinations of the above-described criteria.

In operation S350, the electronic device acquires one or more images from the plurality of candidate images based on the priorities determined in operation S340.

The electronic device may acquire one image having a highest priority from a plurality of candidate images corresponding to one keyword. In other words, one keyword corresponds to one image.

The electronic device may be embodied to acquire a plurality of images from the plurality of candidate images in order of high priorities so as to enable the plurality of images to correspond to one keyword. The number of images acquired from the plurality of candidate images may be embodied to be proportional to a play time of a music segment corresponding to the keyword.

In operation S360, the electronic device displays the one or more images acquired in operation S350.

An image more appropriate for a keyword of a storyline of music may be displayed, and thus a user enjoying the music may further easily understand the music.

Figure 9:
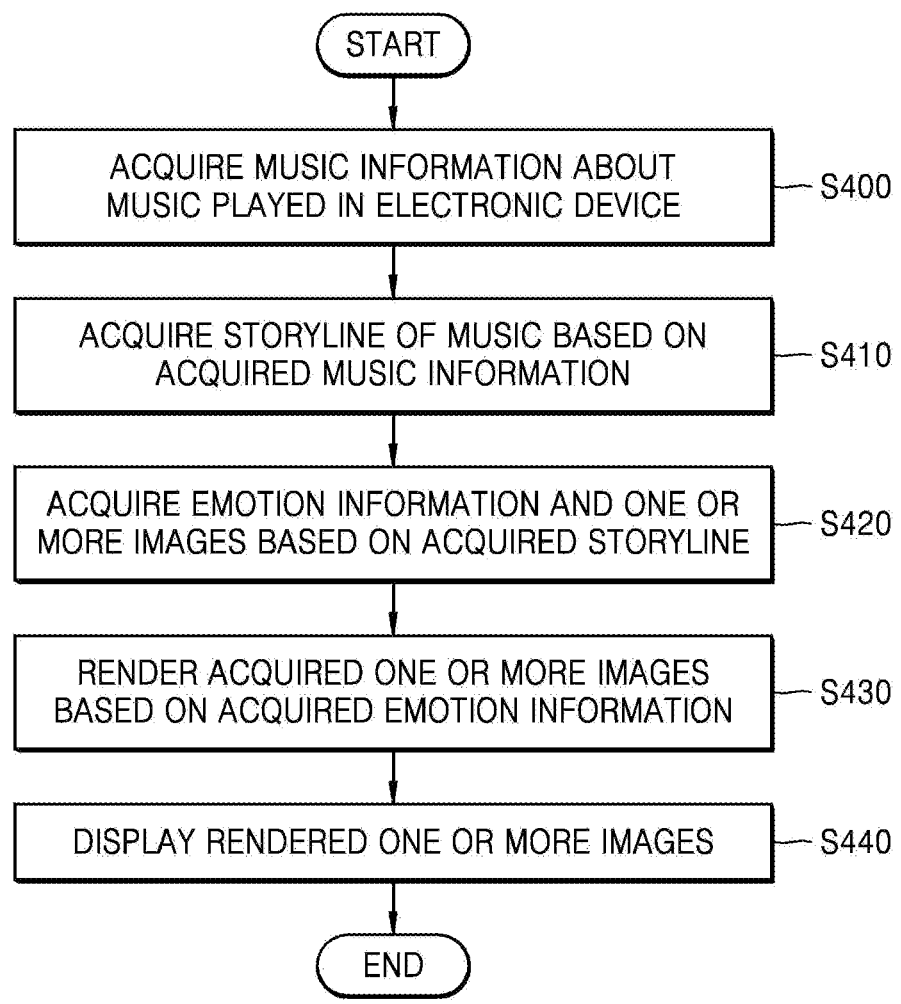
FIG. 9 is a flowchart of a method of rendering and displaying an image associated with music when the music is played in an electronic device, according to an exemplary embodiment.

FIG. 9 is a flowchart of a method of rendering and displaying an image associated with music when the music is played in an electronic device, according to an exemplary embodiment.

Operations S400, S410, S420, and S440 are similar to operations S100, S110, S120, and S130 of FIG. 4, and thus their repeated descriptions are omitted.

In operation S400, the electronic device acquires music information about music played in the electronic device.

In operation S410, the electronic device acquires a storyline of the music based on the music information acquired in operation S400.

In operation S420, the electronic device acquires emotion information and one or more images based on the storyline acquired in operation S410.

When a storyline of music includes texts, one or more keywords may be acquired based on the storyline, and emotion information corresponding to each of the keywords may be acquired through a word emotion DB. The word emotion DB may store a word and its emotion information as a pair, and the electronic device may acquire emotion information corresponding to each of the keywords through DB matching between the keywords and words stored in the word emotion DB. For example, since a word "trouble" is negative, the word emotion DB may store the word "trouble" and its emotion information representing "negative" as a pair. The emotion information may include texts, a code, a symbol, a number, etc. and represent various types of emotions through a combination thereof.

When a storyline of music includes one or more images, semantic information about meanings of the one or more images may be acquired through a semantic analysis, and emotion information corresponding to the semantic information may be acquired through a word emotion DB. The electronic device may acquire emotion information respectively corresponding to the one or more images through DB matching between each semantic information and words stored in the word emotion DB.

The word emotion DB may be pre-stored in the electronic device or an external server.

In operation S430, the electronic device renders the one or more images acquired in operation S420 based on the emotion information acquired in operation S420.

Rendering of an image indicates that a tone, a chroma, a brightness, a contrast, and/or a transparency of the image is adjusted or a graphic effect is given to the image in order to cause a particular emotion for a user who sees the corresponding image.

For example, when acquired emotion information represents a negative emotion, the electronic device may lower a brightness or a chroma of an acquired image to cause a negative emotion for a user who sees the image.

For example, when the acquired emotion information represents a positive emotion, the electronic device may increase the brightness or the chroma of the acquired image to cause a positive emotion for a user who sees the image.

In operation S440, the electronic device displays the one or more images rendered in operation S430.

Since an image is rendered and displayed, the user may further movingly enjoy a storyline of played music.

According to an exemplary embodiment, a storyline may be divided into one or more paragraphs based on at least one selected from among time information, space information, and character information. Also, music may be divided into one or more music segments corresponding to the one or more paragraphs.

Time information refers to words about time in a storyline, such as morning, noon, night, spring, summer, autumn, winter, or the like. When the storyline includes time information "autumn", a sentence including "autumn" belongs to a next paragraph next to a paragraph including its previous sentence.

Space information refers to a word about space in the storyline, such as mountain, a building, a sea, a room, a house, or the like. When the storyline includes space information "mountain", a sentence including "mountain" belongs to a next paragraph next to a paragraph including its previous sentence.

Character information refers to a word about a character in the storyline, such as "you", "me", "he", "she", a name of the character, or the like. When the storyline includes character information "she", a sentence including "she" belongs to a next paragraph next to a paragraph including its a previous sentence.

Divided paragraphs of a storyline may be associated with narrative arc of the storyline, such as "introduction", "development", "turn", and "conclusion". When the storyline is divided into four paragraphs, the four paragraphs may be respectively associated with "introduction", "development", "turn", and "conclusion" of the storyline. When the storyline is divided into three paragraphs, the first paragraph may be associated with "introduction", the second paragraph may be associated with "development" and "turn", and the third paragraph may be associated with "conclusion". When the storyline is divided into two paragraphs, the first paragraph may be associated with "introduction" and "development", and the second paragraph may be associated with "turn" and "conclusion". When the storyline is divided into five paragraphs, the first paragraphs may be associated with "introduction", the last paragraph may be associated with "conclusion", and middle three paragraphs may be equally associated with "development" and "turn".

Paragraphs of a storyline of music may be associated with music segments according to different method. For example, paragraphs of popular music may be associated with music segments through the following method. For convenience of description, the popular music may include intro, verse, chorus, and bridge music segments. Here, narrative arc of the storyline, such as "Introduction", "development", "turn", and "conclusion" may be associated with intro, verse, chorus, and bridge music segments.

Music segments of music may be sequentially played in an electronic device. Each of music segments respectively correspond to narrative arc of the storyline, such as "introduction", "development", "turn", and "conclusion", and narrative arc of the storyline, such as "introduction", "development", "turn", and "conclusion", respectively corresponds to each of paragraphs of a storyline. Therefore, when a music segment is played, the electronic device may display images corresponding to sentences included in a paragraph corresponding to the music segment.

Thus, embodiments of the present invention enable a storyline to be extracted in relation to a music file and for images to be retrieved and displayed in relation to that storyline. The storyline is either available locally or retrieved from an internet search based on meta-data associated with the music file.

All types of documents, including published documents, patent applications, patents, etc. cited in the present invention may be incorporated herein in their entirety by reference.

For understanding the exemplary embodiments, reference numerals are shown in the exemplary embodiments illustrated in the drawings, and particular terminologies are used to describe the exemplary embodiments. However, the exemplary embodiments are not limited by the particular terminologies, and the exemplary embodiments may include all types of elements that may be considered by those of ordinary skill in the art.

The exemplary embodiments may be embodied as functional block structures and various processing operations. These functional blocks may be embodied via various numbers of hardware and/or software structures that execute particular functions. For example, the exemplary embodiments may use direct circuit structures, such as a memory, processing, logic, a look-up table, etc. that may execute various functions through controls of one or more microprocessors or other control apparatuses. Like elements of the present invention may be executed as software programming or software elements, the exemplary embodiments may be embodied as a programming or scripting language such as C, C++, assembly language, or the like, including various algorithms that are embodied through combinations of data structures, processes, routines, or other programming structures. Functional sides may be embodied as an algorithm that is executed by one or more processors. Also, the exemplary embodiments may use related arts to perform electronic environment setting, signal processing, and/or data processing, etc. Terminology such as a mechanism, an element, a means, or a structure may be widely used and is not limited as mechanical and physical structures. The terminology may also include meanings of a series of routines of software along with a processor, etc.

The exemplary embodiments are just exemplary and do not limit the scope of the present disclosure. For conciseness of the present specification, descriptions of the conventional electronic elements, control systems, software, and other functional sides of the systems have been omitted. Also, connections between lines of elements shown in the drawings or connection members of the lines exemplarily indicate functional connections and/or physical connections or circuit connections. The connections may be replaced or may be indicated as additional various functional connections, physical connections, or circuit connections in a real apparatus. When there is no detailed mention such as "necessary", "important", or the like, the connections may not be elements for making the present invention.

The uses of the term "the" and an indicating term similar to the term "the" in the present specification (in particular, in claims) may correspond to both the singular number and the plural number. When a range is described in the exemplary embodiments, individual values belonging to the range are applied to the exemplary embodiments (when there is no description in contrast to this), i.e., the individual values constituting the range are like being described in the detailed description of the exemplary embodiments. When an order of operations constituting a method according to the exemplary embodiments is clearly described or there is no description in contrast to the order, the operations may be performed in any appropriate order. The exemplary embodiments are not necessarily limited to the description order of the operations. The users of all examples or exemplary terms (for example, "etc.") in the exemplary embodiments are simply for describing the exemplary embodiments. Therefore, as the scope of the exemplary embodiments is not limited by the following claims, it is not limited by the examples or the exemplary terms. It will be understood by those of ordinary skill in the art that various modifications, combinations, and changes in form and details may be made according to design conditions and factors therein without departing from the spirit and scope of the exemplary embodiments as defined by the following claims or equivalents thereof.

What is claimed is:

1. A multimedia play device comprising:
    a memory storing instructions; and
    at least one processor configured to execute the instructions to:
        acquire music information about music;
        acquire a storyline of the music based on the music information, wherein the storyline is divided into a plurality of paragraphs based on words about time, a character, or space included in the storyline, and a paragraph comprises a plurality of sentences corresponding to a plurality of keywords;
        divide the music into a plurality of music segments corresponding to the plurality of paragraphs into which the storyline is divided based on the words about time, a character, or space included in the storyline;
        acquire a plurality of images for each keyword of each sentence in the paragraph corresponding to a music segment, and set a number of the images corresponding to each keyword to be proportional to a play time of the music segment corresponding to each keyword; and
        control a display to display the images corresponding to each keyword while the music segment corresponding to each keyword is played.

2. The multimedia play device of claim 1, wherein the music information comprises at least one from among meta-information and audio fingerprint information of the music,
    wherein the storyline is acquired based on the at least one from among the meta-information and the audio fingerprint information.

3. The multimedia play device of claim 1,
    wherein a plurality of candidate images are acquired based on the plurality of sentences, and the plurality of images for each keyword are acquired from the plurality of candidate images.

4. The multimedia play device of claim 1, wherein the at least one processor is further configured to execute the instructions to acquire emotion information associated with the music based on the storyline,
    wherein the plurality of images are acquired based on the emotion information.

5. The multimedia play device of claim 1, wherein the plurality of sentences form the paragraph based on a similarity.

6. The multimedia play device of claim 1, wherein the storyline is lyrics of the music,
    wherein the music information comprises lyric information about the lyrics, and the plurality of images are displayed based on the lyric information.

7. The multimedia play device of claim 1, wherein the at least one processor is further configured to execute the instructions to acquire emotion information based on the storyline,
    wherein the plurality of images are acquired based on the emotion information.

8. The multimedia play device of claim 6, wherein the plurality of images are rendered based on emotion information.

9. The multimedia play device of claim 1, wherein the at least one processor is further configured to execute the instructions to:
    acquire a plurality of candidate images based on the plurality of keywords of the plurality of sentences in the paragraph corresponding to the music segment;
    determine priorities between the plurality of candidate images based on a preset criterion,
    wherein the plurality of images are acquired from the plurality of candidate images based on the determined priorities, and the preset criterion is at least one from among orders between the plurality of candidate images and a number of times that a candidate image is repeatedly provided.

10. The multimedia play device of claim 1, wherein when the storyline includes a music video, the plurality of images are acquired from one or more images from frames of the music video.

11. The multimedia play device of claim 1, wherein the at least one processor is further configured to execute the instructions to:
acquire a plurality of candidate images based on the plurality of keywords of the plurality of sentences in the paragraph corresponding to the music segment;
determine priorities between the plurality of candidate images based on a preset criterion,
wherein the plurality of images are acquired from the plurality of candidate images based on the determined priorities.

12. A method of playing a multimedia, the method comprising:
acquiring music information about music;
acquiring a storyline of the music based on the music information, wherein the storyline is divided into a plurality of paragraphs based on words about time, a character, or space included in the storyline, and a paragraph comprises a plurality of sentences corresponding to a plurality of keywords;
dividing the music into a plurality of music segments corresponding to the plurality of paragraphs into which the storyline is divided based on the words about time, a character, or space included in the storyline;
acquiring a plurality of images for each keyword of each sentence in the paragraph corresponding to a music segment, and setting a number of the images corresponding to each keyword to be proportional to a play time of the music segment corresponding to each keyword; and
displaying the images corresponding to each keyword while the music segment corresponding to each keyword is played.

13. The method of claim 12, wherein the music information comprises at least one from among meta-information and audio fingerprint information of the music,
wherein the storyline is acquired based on the at least one from among the meta-information and the audio fingerprint information.

14. The method of claim 12,
wherein a plurality of candidate images are acquired based on the plurality of sentences, and the plurality of images for each keyword are acquired from the plurality of candidate images.

15. The method of claim 12, further comprising:
acquiring emotion information based on the storyline,
wherein the plurality of images are acquired based on the emotion information.

16. A non-transitory computer-readable recording medium having recorded thereon a program for realizing the method of claim 12.

17. The method of claim 12, wherein the method further comprises:
acquiring a plurality of candidate images based on the plurality of keywords of the plurality of sentences in the paragraph corresponding to the music segment; and
determining priorities between the plurality of candidate images based on a preset criterion,
wherein the plurality of images are acquired from the plurality of candidate images based on the determined priorities, and the preset criterion is at least one from among orders between the plurality of candidate images and a number of times that a candidate image is repeatedly provided.

18. The method of claim 12, wherein when the storyline includes a music video, the plurality of images are acquired from one or more images from frames of the music video.

19. The method of claim 12, wherein the method further comprises:
acquiring a plurality of candidate images based on the plurality of keywords of the plurality of sentences in the paragraph corresponding to the music segment; and
determining priorities between the plurality of candidate images based on a preset criterion,
wherein the plurality of images are acquired from the plurality of candidate images based on the determined priorities.

* * * * *